Figure 3:
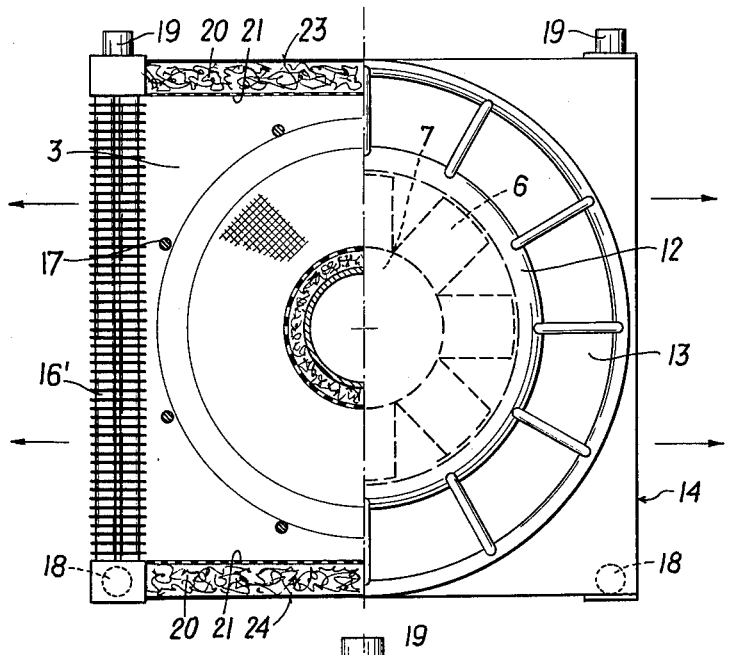

United States Patent [19]
Fachbach et al.

[11] 3,978,919
[45] Sept. 7, 1976

[54] COOLER-CUM-BLOWER ASSEMBLY FOR INTERNAL COMBUSTION ENGINES

[75] Inventors: Heinz Fachbach; Gerhard Thien; Josef Greier, all of Graz, Austria

[73] Assignee: Hans List, Graz, Austria

[22] Filed: Sept. 19, 1974

[21] Appl. No.: 507,421

[30] Foreign Application Priority Data
Mar. 20, 1974   Austria .................. 2314/74

[52] U.S. Cl. ................... 165/135; 165/125; 123/41.49
[51] Int. Cl.² .......................... F28F 13/00
[58] Field of Search ............ 165/135, 124, 125; 123/41.49

[56] References Cited
UNITED STATES PATENTS

| | | | |
|---|---|---|---|
| 1,872,785 | 8/1932 | Modine | 165/125 |
| 1,884,898 | 10/1932 | Smith | 165/125 |
| 2,044,832 | 6/1936 | Child | 165/125 |
| 2,174,677 | 10/1939 | Young | 165/135 |
| 2,346,410 | 4/1944 | Ashley | 165/125 |
| 2,370,309 | 2/1945 | Hartwig | 165/125 |
| 2,457,934 | 1/1949 | Spieth | 165/125 |
| 2,458,159 | 1/1949 | Goldthwaite | 165/125 |
| 2,638,757 | 5/1953 | Borgerd | 165/135 |
| 2,873,097 | 2/1959 | Brandi | 165/135 |
| 3,455,378 | 7/1969 | Honnold | 165/135 |

*Primary Examiner*—Charles J. Myhre
*Assistant Examiner*—Daniel J. O'Connor
*Attorney, Agent, or Firm*—Watson, Cole, Grindle & Watson

[57] ABSTRACT

A cooler-cum-blower assembly for water-cooled internal combustion engines, comprising a housing subdivided by means of a partition into two chambers having a sound-absorbing lining, an axial blower impeller arranged in a central aperture of the partition, an air-intake aperture in the housing in the area of the chamber located in front of the impeller, and a water-cooler forming at least part of the peripheral wall of the chamber located behind the impeller.

6 Claims, 3 Drawing Figures

U.S. Patent  Sept. 7, 1976  3,978,919

COOLER-CUM-BLOWER ASSEMBLY FOR INTERNAL COMBUSTION ENGINES

The invention relates to a cooler-cum-blower assembly for internal combustion engines, in particular for automotive engines comprising a water cooler ventilated by means of an axial blower.

The design of cooler-cum-blower assemblies of the conventional type, such as used in connection with automotive engines, building machinery and stationary installations, generally reveals a tendency to provide for blowers of the most inexpensive kind comprising impellers usually composed of sheet metal members or occasionally even made in one piece of synthetic materials. As a rule, the blower is mounted on a driving shaft located on the engine at a very short distance from the engine and the cooler, also arranged at a short distance from and in front of the blower is usually supported by the frame. The housing, if any, shutting-off the space between the cooler and the blower is generally rigidly fixed to the frame so that it is necessary to make provision for a large-sized impeller clearance in view of the relative motions between the engine and the frame and also because of the comparatively coarse manufacturing tolerances. As a result of this failure to observe aerodynamic principles the efficiency of such blowers is bound to be rather low. On account of the short distance and the unfavorable flow-off conditions the blower is required to produce a substantially higher pressure than usual, the necessary pressure level being approximately double the pressure needed to overcome the plain cooler resistance. Consequently, the noise produced by this type of ventilators is about 10 dBA in excess of the noise level customary for the same amount of air if the plain cooler resistance were overcome by means of a blower of high aerodynamic efficiency and if ideal inflow and outflow conditions prevailed. However, the lack of available space in automotive engines would not permit such an ideal solution. As a matter of fact, while comparatively favorable flow conditions prevail on the side of the cooler facing away from the engine, the distance between the blower and the engine would have to be increased considerably, since individual obstacles impairing the inflow or outflow of the blower air will increase the production of noise to a quite considerable extent.

More favorable conditions prevail in cooler-cum-blower assemblies where the blower is located on the side of the cooler facing away from the engine. In that case, the blower is located at a greater distance from the engine interfering with the flow and besides, the interference is mitigated by the cooler lying in between. However, a shortcoming of this arrangement resides in the fact that the blower-actuating member has to extend through the cooler, resulting in higher production costs and more difficult assembling conditions. Moreover, even with this conventional design it is not possible to keep the distance between the cooler and the engine short enough to obtain a very compact layout of the system if the flow between the cooler and the engine is not to be interfered with excessively and efforts to reduce the pressure to be produced by the blower for the purpose of attenuating noise are not to be frustrated.

According to another known design, the noise produced by cooler-cum-blower assemblies is attenuated by means of the provision of a sound-proof casing and by inflow and outflow air shafts equipped with a special lining absorbing sounds transmitted by air and mounted in front. Due to the large quantities of air to be delivered, the shafts must necessarily have sizeable cross-sections which according to contemporary cooler-cum-blower layouts can be accomodated in front of the cooler but not within the narrow space between the blower and the engine. Consequently, the axial overall length of such a cooler-cum-blower assembly is noticeably greater if sound-absorbing shafts are provided, not only because of the shaft in front of the cooler but also in view of the increased distance between the blower and the engine.

Finally, according to another known design of a cooler-cum-blower assembly, the same is included in the sound-proof casing of the engine. In this known case the shaft equipped with a lining absorbing sound transmitted by air formerly provided between the blower and the engine is placed in the area of the clutch housing where more space is available generally. However, an essential shortcoming of this known arrangement resides in the fact that the entire cooling air has to pass through between the engine and the casing wall, requiring an unnecessarily large distance of the casing walls encompassing the engine, since as a rule, approximately the tenth part of the quantity of air to be delivered by the cooler is sufficient for the ventilation of this casing area.

It is the purpose of the present invention to provide a cooler-cum-blower assembly of the type herebefore described, avoiding the drawbacks of the aforesaid known arrangements and distinguishing itself by its noiseless design. According to the invention, a casing divided into two chambers equipped with a sound-absorbing lining and forming the intake and exhaust air shafts of the blower, wherein the axial blower is located centrally between the two chambers, said casing carrying the cooler on its periphery in the area of one of the two chambers.

This design combines the known advantages of an axial blower with the convenient features of a design of extreme compactness, particularly in an axial direction in addition to a high degree of acoustic efficiency of the casing means. The combination of an axial blower with cooler elements arranged and traversed radially and not axially, results in an overall length of the assembly which is not larger than with the usual cooler-cum-blower arrangement. On the other hand, the overall axial space required for the arrangement according to the present invention is considerably less, since the assembly terminates with the rear wall of the casing, whereas for the arrangements of conventional design sufficient space for the air flow has to be provided between the blower and stationary obstacles, such as for example, the front end of the engine. It is, therefore, possible to attach the cooler-cum-blower assembly directly to the front face of the engine, and/or to combine it with an engine casing provided for acoustic or other reasons. At the same time, it is possible to provide a rigid connection between the cooler-cum-blower assembly and the engine permitting of a direct rigid attachment of the blower shaft to one extremity of the motor shaft on the one hand, and an elastic and sound-proofing attachment of the assembly to the engine or to the vehicle frame or foundation, the drive being through a cardan shaft binding between the blower shaft and the engine, on the other hand. It is, however, also possible to use any other kind of drive, such as for example, a hydrostatic drive or an electric power drive.

The fact that the radial dimensions of the cooler-cum-blower assembly according to the invention can be also maintained at a comparatively small scale is due to the use of an axial blower, since an axial blower being tops among flow machines, has the smallest external diameter for a given delivery. Consequently, even if the casing is of a relatively small diameter, there is ample space in the area between the impeller and the cooler located on the periphery for the accommodation of a sound-proofing shaft equipped with a lining absorbing sound transmitted by air.

The invention furthermore permits of a design of a blower of considerable aerodynamic value by the provision of an extremely narrow impeller clearance since no relative movements between the impeller and the external ring of the blower occur. This makes for a very high level of blower efficiency even blowers of the impeller-less variety having a minimum overall length.

As a result of the peripheral location of the cooler and the radial flow in the chamber located between the cooler and the blower, flow cross-sections are relatively large and flow losses small and can be further reduced by giving the sound-absorbing lining of the chamber a particular aerodynamically advantageous shape.

The high acoustic efficiency of the casing is a result of the fact that the material absorbing sound transmitted by air is located directly in front of and behind the blower, generally between the blower and the cooler, that is, in lieu of its conventional location in front of the cooler and behind the ventilator or, when the air flows in the opposite direction, in front of the ventilator and behind the cooler. Moreover, because of the peripheral arrangement of the cooler the connection between the backwall and the partition of the casing is placed sufficiently outside so as to preclude noise-augmenting interference with the current due to the presence of connecting elements. At the same time, the disk-shaped annular chamber between the sound-absorbing linings of the backwall and the partition of the casing, if adequately dimensioned, acts as an annular diffusor. To a certain extent the pressure recovery achievable in this manner provides compensation for the effect of an impeller and likewise increases blower efficiency.

According to a preferred embodiment of the invention at least the portion of the casing including the intake air shaft is of a cylindrical shape and presents an annular air intake at its front end. This design not only provides centrosymmetrical inflow conditions for the blower, but as is customary for vehicles, owing to the front-end location of the intake aperture, advantage can be taken of the dynamic pressure of the driving wind for improving the delivery of air. As a variant of this design, it is of course, also possible to make provision for a radial inflow of air from the periphery of the casing.

According to a further embodiment of the invention, the cooler is of an annular shape and encompasses the associated chamber of the casing peripherically. In that case, the radial flow through the cooler is practically effected over the entire periphery of the casing so that major flow cross-sections are available and only minor losses of pressure have to be registered.

As a variant of this design feature it is also possible, according to the invention, for the cooler-carrying portion of the casing to be of angular contours, having a rectangular outline, for example, the cooler comprising two or more cooler elements having a plane surface and arranged on the periphery of this portion of the casing. This arrangement distinguishes itself by reduced manufacturing costs of standard-type block-shaped cooler elements as compared with a cooler of annular shape. such peripheral walls as are not occupied by cooler elements, such as the upper and lower wall of the said casing portion, are then also lined with materials absorbing sound transmitted by air.

According to an other embodiment of the invention, the sound-absorbing lining of the casing is, in a manner known per se maintained in place by means of perforated sheet metal serving simultaneously for the support and protection of the sound-absorbing material.

Figure 2:
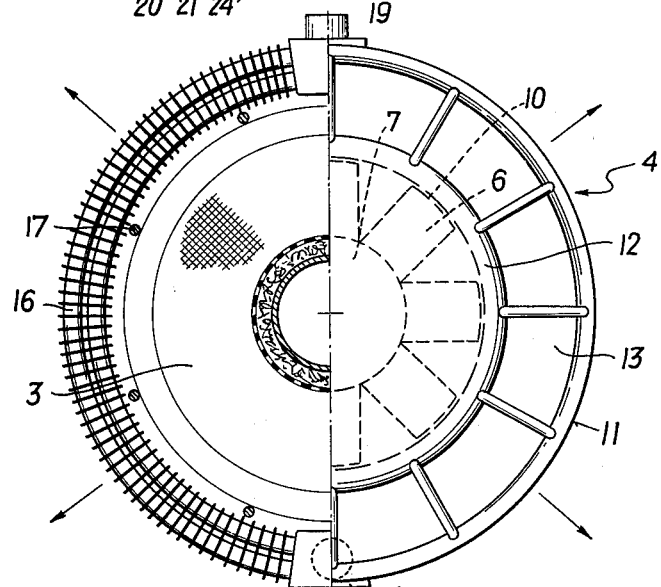
Figure 1:
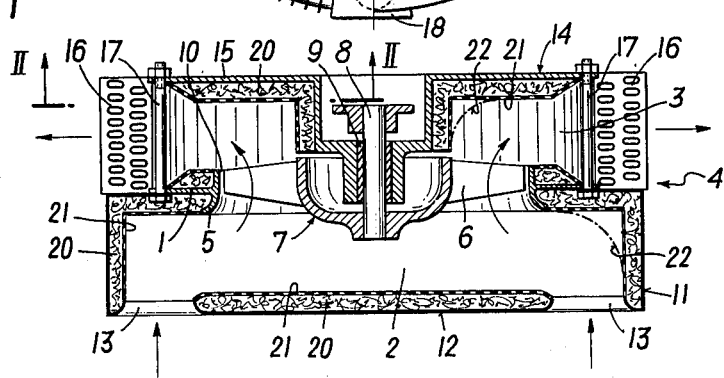

Further details of the invention will become apparent from the following description of several preferred embodiments of the invention with reference to the accompanying drawing in which FIG. 1 shows an axial cross-sectional view of a cooler-cum-blower assembly according to the invention, FIG. 2 is a combined top plan view and a sectional view of the assembly taken substantially along line II — II of FIG. 1, and FIG. 3 a cross-sectional view of a variant of the cooler-cum-blower assembly according to the invention corresponding to the view shown in FIG. 2.

The cooler-cum-blower assembly illustrated in FIGS. 1 and 2 is designed as an essentially cylindrical casing 4 divided by means of a partition 1 into two chambers 2 and 3 provided with a sound-absorbing lining. The partition 1 has a central aperture bordered by a ring 5, wherein the impeller 6 of an axial blower 7 centrally located in the casing 4 is inserted, the shaft of said blower being designated by reference number 8 and the place where it is supported in the casing by reference number 9. Together with the outer ring 5 of the blower the impeller 6 defines an impeller clearance 10 kept within the narrowest limits possible taking the manufacturing tolerances into account only.

Assuming the flow through the cooler-cum-blower assembly being directed as indicated by arrows in the drawing, the portion 11 of the casing located in front of the blower 7 forms the air-intake housing whose outer front wall 12 presents an annular air inlet 13. The portion 14 of the casing 4 located behind the blower 7 encompasses the circular backwall 15 and the annular water cooler 16 of the assembly located on the periphery between said backwall and the partition 1. The backwall 15 and the cooler 16 are secured by means of a number of bolts 17 evenly distributed over the periphery of the casing. The means for supplying water to the cooler 16 is designated by reference number 19 and the means for the discharge of the water by reference number 18.

The above-mentioned sound-absorbing lining of the two chambers 2 and 3 of the casing 4 consists of sound-absorbing coatings 20 maintained in position in a manner known per se by means of perforated sheet metal 21 and protected by same against mechanical damage. These coatings 20 cover all of the exposed inner surfaces of the two chambers 2 and 3, so that the latter provide intake and outlet sound-absorbers for the blower air of high acoustic efficiency.

In contrast to the conventional blower-cum-cooler systems the air is discharged at the delivery end of the blower 7 not in an axial direction, but the blower air is deflected within the chamber 3 in a radial direction so that the cooling-air current passes evenly distributed over the entire periphery of the casing 4 in a radial direction through the cooler 16. As a result of the circular-symmetrical design of the air intake housing 11 centrosymmetrical flow conditions with relatively large flow cross-sections and low losses of pressure are due to prevail also at the delivery end. The deflection of the outflowing blower air in the chamber 3 and the use of an axial blower 7 result in a very small axial overall length of the cooler-cum-blower assembly. Besides, it will not be necessary to provide a distance between the cooler and the front end of the engine as required in conventional cooler-cum-blower systems in order to reduce resistance to flow and the production of noise. Consequently, the overall axial dimension of the engine including the cooler-cum-blower assembly is not greater than that of known type operating on a high noise level.

If the cooler-cum-blower assembly according to the invention is used in connection with an automotive engine, the arrangement of the annular air inlet 13 at the front end of the casing is particularly convenient because in that case the driving wind actively enhances the delivery effect of the blower 7. In stationary internal combustion engines the air inlet might also be provided on the periphery of the air intake housing 11 as different from the embodiment illustrated.

As indicated by dash-and-dot lines 22 on the right half of FIG. 1, for the purpose of improving flow conditions it is possible to design the perforated sheets 21 provided for the support of the sound-absorbing coatings 20 with spatially curves surfaces presenting rotation symmetry as a result of which losses of pressure would be reduced and the absorption of sound increased. A certain increase of the acoustic effect can, however, be additionally achieved by additional partitions of a material absorbing sound transmitted by air arranged so as to present rotation symmetry or radially. Finally it would also be possible to provide a radial impeller within the chamber 3 in the annular area outside the impeller diameter between the backwall 15 and the partition 1 for the purpose of converting part of the energy of the peripheral speed into pressure, thereby still further improving the efficiency of the blower.

The design of the cooler-cum-blower assembly illustrated in FIG. 3 differs from the construction shown in FIGS. 1 and 2 only insofar as the portion 14 of the casing located behind the blower 7 is of a square shape and the water cooler comprises two block-shaped cooler elements 16' interconnected upstream and forming the vertical sidewalls of this casing portion 14. In that case the chamber 3 of the casing 4 is shut off upwards and downwards by means of limiting partitions 23 and 24 which like the remaining inner walls of the casing are provided with sound-absorbing coatings 20 maintained in position by perforated plates 21.

At the air intake end the same flow conditions as in the first-mentioned embodiment of the invention prevail also in the construction as shown in FIG. 3. The only difference at the air outlet end consists in that the flow-off does not extend over the entire circumference of the casing portion 14, but only towards the laterally arranged cooler elements 16. Here again it is possible to provide uniformity of the flow-off towards the two cooler elements by the incorporation of guiding walls in the chamber 3.

In principle, it is possible to reverse the direction of flow both in connection with the embodiments of the invention hereabove described and as illustrated in the drawings and in other types of cooler-cum-blower assemblies within the scope of the present invention in such a manner that the cooler is located at the suction end of the blower. The characteristic advantages of the invention consisting in the compactness of design and a high level of acoustic efficiency will apply also to this type of flow.

I claim:
1. A water cooler-cum-blower unit for water-cooled internal combustion engines, in particular for automotive engines, comprising a housing having a front wall, a back wall and a peripheral wall, a partition located between and parallel to the front wall and the back wall, the partition subdividing the housing into first and second adjoining chambers and having a central circular aperture, an axial blower arranged centrally in said housing and having an impeller provided in said aperture of the partition, said first chamber being located in front of the blower impeller and forming a substantially disc-shaped air-intake shaft connecting an air-intake opening provided in said front wall of the housing with said central aperture of the partition, said second chamber being located behind the blower impeller and forming a substantially disc-shaped air outlet shaft connecting the central aperture of the partition with an air-outlet opening provided in the peripheral wall of the housing, both said disc-shaped air intake and air outlet shafts providing means for effecting a non-axial flow path, both said chambers being lined with sound-absorbing coatings, a water-cooler located in the area of said air-outlet opening and forming at least part of the peripheral wall of the housing.

2. A water cooler-cum-blower unit according to claim 1, wherein the peripheral wall of the housing is cylindrical at least in the area of said first chamber and the air-inlet aperture of said front wall of the housing is an annular opening, the inner diameter of said annular opening being at least equal to the outer diameter of said central aperture of the partition.

3. A water cooler-cum-blower unit according to claim 1, wherein the water-cooler is of annular design encompassing said second chamber of the housing.

4. A water cooler-cum-blower unit according to claim 1, wherein the sound-absorbing coatings of both said chambers are secured to the housing by means of perforated plates.

5. A water cooler-cum-blower unit according to claim 1, wherein said outlet shaft is of a rectanguler shape, and said outlet shaft connecting the central aperture of the partition with both said air outlet opening and with another air outlet opening provided opposite one another in the peripheral wall of the housing in the area of the second chamber, said water-cooler comprising at least two cooler elements each having a plane surface, said cooler elements being respectively located in the area of said air outlet openings.

6. A water cooler-cum-blower unit according to claim 5, wherein the sound absorbing coatings of both said chambers are secured to the housing by means of perforated plates.

* * * * *